United States Patent
Landolt (12) 
(10) Patent No.: US 8,916,002 B1
(45) Date of Patent: Dec. 23, 2014

(54) PORTABLE VACUUM FOR YARD WASTE

(76) Inventor: James Landolt, Oshkosh, WI (US)

( * ) Notice: Subject to any disclaimer, the term of this patent is extended or adjusted under 35 U.S.C. 154(b) by 838 days.

(21) Appl. No.: 13/090,330

(22) Filed: Apr. 20, 2011

Related U.S. Application Data (60) Provisional application No. 61/326,421, filed on Apr. 21, 2010.

(51) Int. Cl.
*A47L 5/00* (2006.01)
*A47L 9/00* (2006.01)
*B08B 5/04* (2006.01)

(52) U.S. Cl.
USPC ............... 134/21; 15/300.1; 15/329; 15/330; 15/335; 15/345

(58) Field of Classification Search
USPC .......................... 15/300.1, 329, 330, 335, 345
See application file for complete search history.

(56) References Cited

U.S. PATENT DOCUMENTS

| | | | | |
|---|---|---|---|---|
| 5,661,873 | A | * | 9/1997 | Karet ............................... 15/344 |
| 6,131,239 | A | * | 10/2000 | White ............................ 15/352 |
| 2009/0271942 | A1 | | 11/2009 | Reynolds et al. |
| 2010/0199454 | A1 | * | 8/2010 | Pruitt et al. ...................... 15/301 |

\* cited by examiner

*Primary Examiner* — Saeed T Chaudhry
(74) *Attorney, Agent, or Firm* — James R. Eley; Michael A. Forhan; Eley Law Firm Co. LPA

(57) ABSTRACT

A portable vacuum includes a container having a sidewall, an open bottom portion, an opposing, open top portion and an attachment opening in the sidewall. A bucket is detachably coupled to the container. A vacuum unit is detachably coupled to and closes off the top portion of the container, the vacuum unit having at least one air inlet and at least one air exhaust port. The vacuum unit is operable to selectably generate an air stream entering the air inlet and exiting the air exhaust port. The portable vacuum also includes an elongate, generally hollow suction tube having a first end and an opposing second end, the first end being detachably coupled to the attachment opening of the container. The air stream generates a vacuum at the second end of the suction tube operable to draw waste material into the suction tube, the waste material being deposited in the bucket.

20 Claims, 8 Drawing Sheets

PORTABLE VACUUM FOR YARD WASTE

This application claims priority to U.S. provisional application 61/326,421, filed Apr. 21, 2010, the entire contents of which are hereby incorporated by reference.

FIELD

The present invention relates generally to a device for gathering yard waste, in particular to a portable vacuum to draw in and contain the yard waste for disposal.

BACKGROUND

Sweeping outdoor areas such as lawns, pedestrian streets, parking places and the like of leaves, grass clippings and other debris is typically accomplished using hand tools such as rakes and brooms. Although effective, hand tools are slow and laborious, a significant drawback when maintaining large areas.

An alternative device for grounds keeping is a "leaf blower," which uses an internal combustion engine or an electric motor to operate a fan, which generates an air stream expelled from a tube. The user aims the tube at the debris, using the air stream to gather or disperse the debris. A shortcoming of leaf blowers is their tendency to hurl the debris at high velocity, which often leads to damage to nearby objects such as automobiles. In addition, it can be laborious and time-consuming to urge debris around various objects such as shrubbery and automobiles using a leaf blower.

Some leaf blowers are convertible for use as either a blower or a vacuum by attaching an elongated tube to either an air inlet or an air outlet of the fan housing. In a blower mode, a concentrator tube concentrates air expelled through the air outlet to create a highly-directed stream of high velocity air at the end of the tube. A cover is placed over the air inlet to prevent accidental ingestion of objects while permitting a free flow of air into the air inlet. In a vacuum mode, the concentrator tube is removed from the air outlet. A vacuum tube, typically having a larger diameter than the concentrator tube, is attached to the air inlet after the cover is removed. Air drawn through an opening in the end of the vacuum tube tends to entrain objects loose in the vicinity of the end of the tube. The objects are carried by the flow into the fan and then discharged into a porous sack hung around the air outlet to collect debris. A particular problem with these devices is that of gathering solids such as animal waste. These solids are typically too heavy to be drawn into the concentrator tube or, if drawn in, may become lodged in the tube. In addition, collecting animal wastes with such devices can be unpleasant due to odors from collected wastes emanating from the porous sack.

SUMMARY

A portable vacuum for yard waste is disclosed according to an embodiment of the present invention. The portable vacuum includes a container having an open bottom portion. A bucket is detachably coupled to the container, as is a suction tube. A vacuum unit is also detachably coupled to the container. The vacuum unit includes a pair of motor-driven fans, as well as a handle having an ON-OFF switch and an optional voltage indicator. When the ON-OFF switch is set to an ON position electrical voltage from an energy source, such as a battery, is supplied to the electric motors. Output shafts of the electric motors rotate, causing the fans to rotate. The rotation of the fans causes air to be drawn out of the container and the bucket and exhausted through an exhaust port, resulting in the development of air suction through the suction tube. A user aims a distal end of the suction tube at debris to be collected. The debris is drawn into the suction tube and drops through the open bottom of the container, into the bucket.

In one embodiment of the present invention a portable vacuum comprises a container having a sidewall, an open bottom portion, an opposing, open top portion and an attachment opening in the sidewall. A bucket is detachably coupled to the container, the bucket receiving the bottom portion of the container. A vacuum unit is detachably coupled to and closes off the top portion of the container, the vacuum unit having at least one air inlet and at least one air exhaust port. The vacuum unit is operable to selectably generate an air stream entering the air inlet and exiting the air exhaust port. The portable vacuum further includes an elongate, generally hollow suction tube having a first end and an opposing second end. The first end of the suction tube is detachably coupled to the attachment opening of the container. The air stream generates a vacuum at the second end of the suction tube operable to draw waste material into the suction tube, the waste material being deposited in the bucket.

In another embodiment of the present invention a portable vacuum comprises a container having a sidewall, an open bottom portion, an opposing, open top portion and an attachment opening in the sidewall. A bucket is detachably coupled to the container, the bucket receiving the bottom portion of the container. A vacuum unit is detachably coupled to and closes off the top portion of the container. The vacuum unit includes: a pair of rotatable fans; an upper fan case and a lower fan case, the upper and lower fan cases enclosing the rotatable fans; a pair of electric motors, each motor coupled to one of the rotatable fans, the electric motors each being selectably coupled to an electric power source and being operable to rotate the rotatable fans when coupled to the electric power source; a carrying handle; at least one air inlet; and at least one air exhaust port extending through the upper and lower fan cases and in communication with the container. The vacuum unit is operable to selectably generate an air stream entering the air inlet and exiting the air exhaust port. An electrical switch selectably couples the electric motor to the electric power source. The portable vacuum further includes an elongate, generally hollow suction tube having a first end and an opposing second end, the first end being detachably coupled to the attachment opening of the container. The air stream generates a vacuum at the second end of the suction tube operable to draw waste material into the suction tube, the waste material being deposited in the bucket.

BRIEF DESCRIPTION OF THE DRAWINGS

Further features of the inventive embodiments will become apparent to those skilled in the art to which the embodiments relate from reading the specification and claims with reference to the accompanying drawings, in which:

DETAILED DESCRIPTION

The general arrangement of a portable vacuum 10 is shown in FIGS. 1 through 8 according to various embodiments of the present invention. Portable vacuum 10 includes a container 12 having an open bottom portion 14, an opposing, open top portion 16, a sidewall 18, and an attachment opening 20 in the sidewall. Container 12 fits inside a bucket 22, which is detachably coupled to the container. Sidewall 18 is configured to extend into bucket 22 when the bucket is coupled to container 12, and may be further configured to abut against a major portion of a sidewall 23 of the bucket.

A suction tube 24 is likewise detachably coupled to container 12. Suction tube 18 is elongate and is generally hollow, with openings at first and second opposing ends. In some embodiments an end 26 of suction tube 24 distal to container 12 may include an angled portion 28, allowing a user to hold portable vacuum 10 at a comfortable angle while directing the distal end of the suction tube at waste material to be collected.

A vacuum unit 30 is also detachably coupled to container 12. Vacuum unit 30 includes a lower fan case 32 and an upper fan case 34, the lower and upper fan cases enclosing a pair of rotatable fans 36. The lower fan case includes a left portion 33 and a right portion 35, each being associated with a corresponding fan 36. A pair of electric motors 38 are attached to upper fan case 34, an output shaft 40 of each motor being coupled to a corresponding fan 36. Each motor 38 is enclosed by a motor cover 42 attached to upper fan case 34. The upper and lower fan cases 32, 34, are configured to form a separate ducted left air passage 37 and right air passage 39 from each fan.

A carrying handle 44 comprising a left handle portion 46 and a right handle portion 48 are also attached to upper fan case 34. An electrical ON-OFF switch 50 is coupled to left handle portion 44 and right handle portion 46, as is an optional voltage level indicator 52.

The various stationary components of portable vacuum 10, such as container 12, bucket 22, suction tube 24, lower fan case 32, upper fan case 34, motor covers 42, left handle 46 and right handle 48 may be made from any materials that are compatible with the expected environment for a portable vacuum system including, without limitation, metal, plastic and composites. In addition, the components may be fabricated using any suitable manufacturing processes separately or in combination including, but not limited to, machining, molding, casting, hydro forming and spinning. The components may be finished, if desired, by any suitable method including, without limitation, painting, plating, texturing, molded-in colorants and dyes, or may be unfinished.

Electric motors 38 may be any suitable type of DC motor including, without limitation, permanent-magnet motors, shunt wound motors, series wound motors, compound wound motors and brushless DC (BLDC) motors. In alternate embodiments of the present invention electric motors 38 may be an AC-type motor powered by an AC power source.

Fans 36 may be any suitable rotating arrangement of vanes or blades which act on air to generate an air stream. Fans 36 may be, without limitation, axial-flow fans, centrifugal fans and crossflow fans.

ON-OFF switch 50 may be any suitable type of electrical switch having an electrical rating compatible with the load presented by motors 38. In addition, ON-OFF-switch 50 may be a momentary or a non-momentary type of switch. In some embodiments ON-OFF switch 50 is in the form of a "trigger" actuable by a finger of a user while grasping carrying handle 44.

Figure 3:
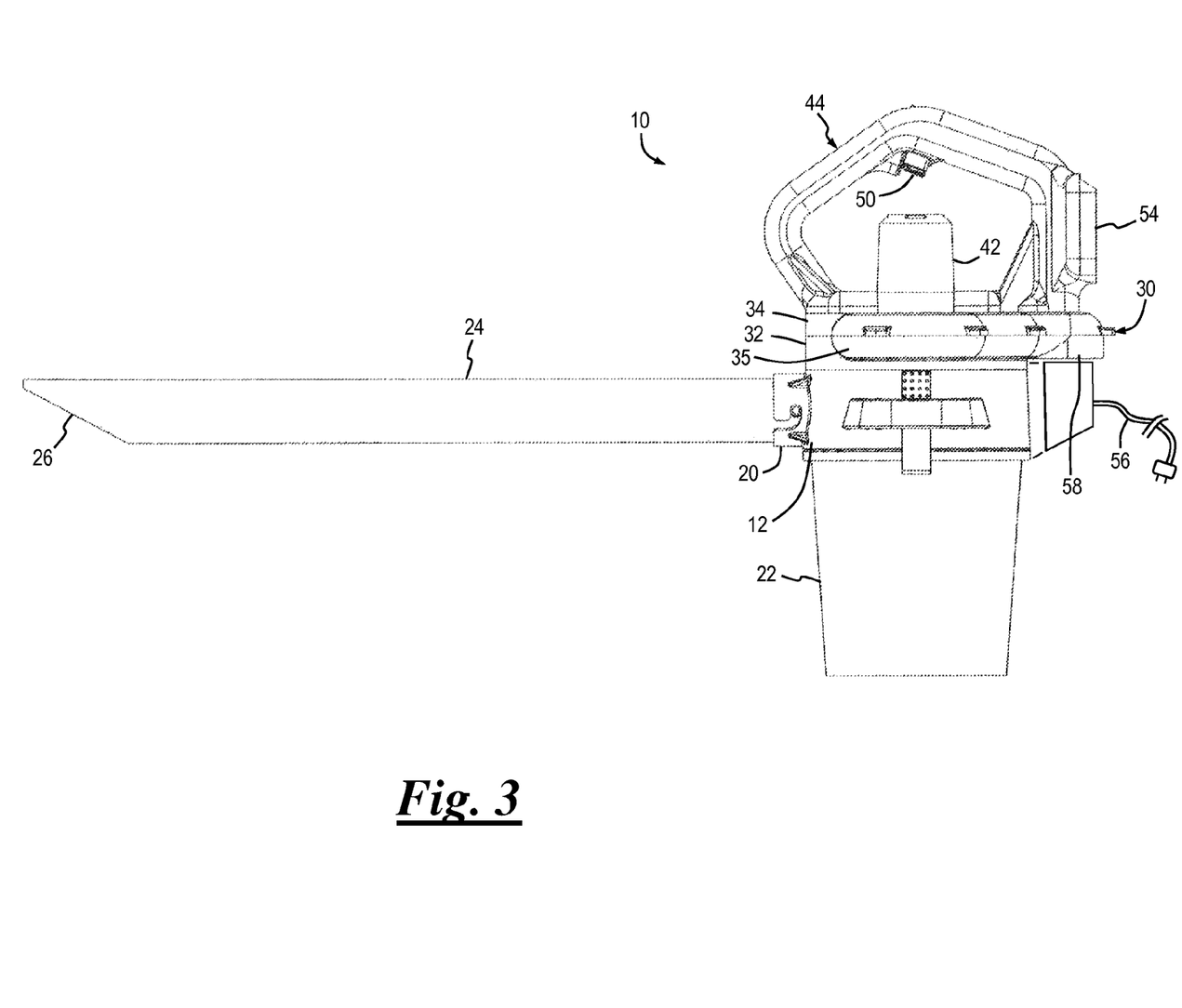
FIG. 3 is a left-side elevational view of the portable vacuum of FIG. 1.
Figure 4:
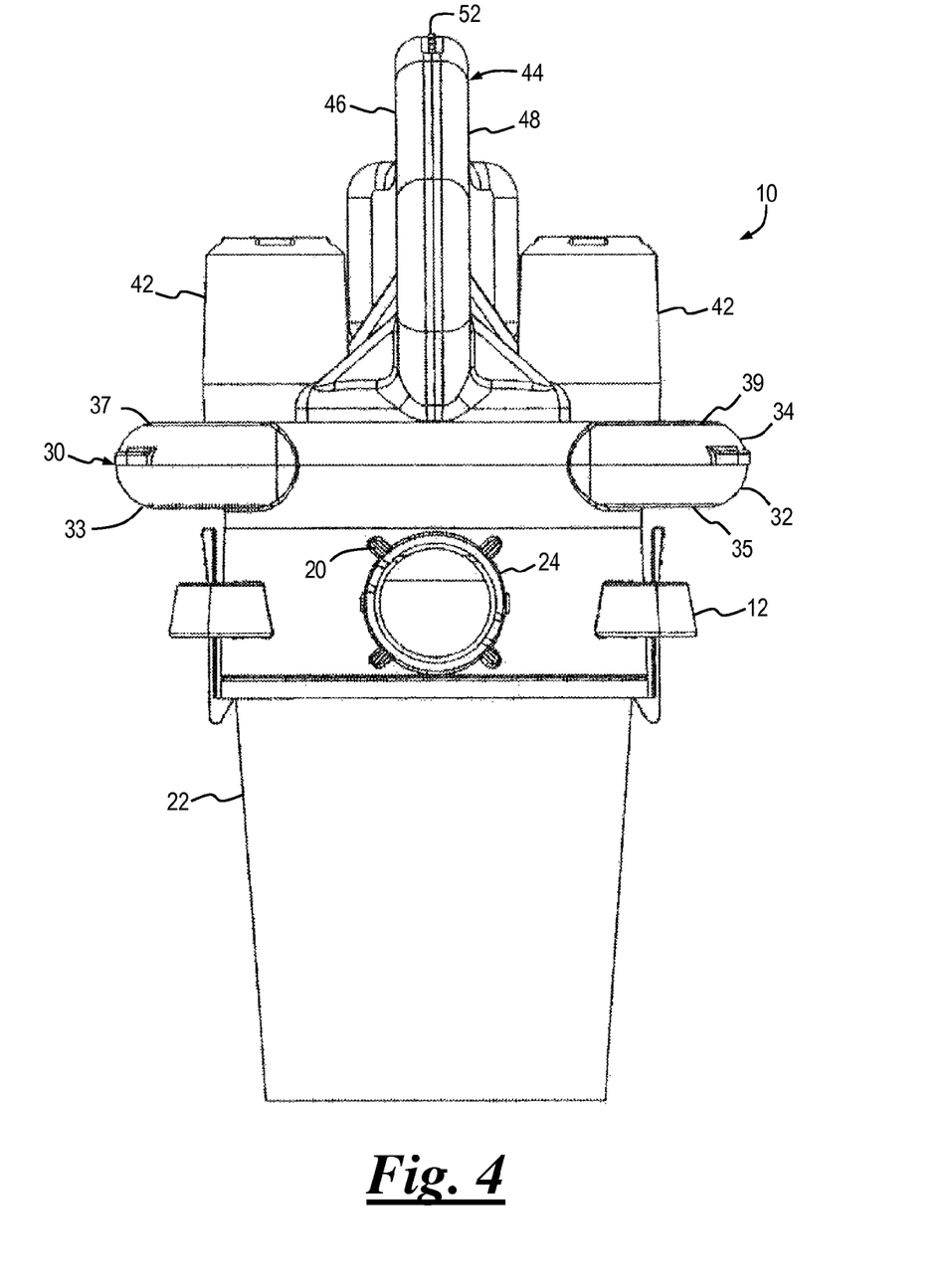
FIG. 4 is a front elevational view of the portable vacuum of FIG. 1.
Figure 5:
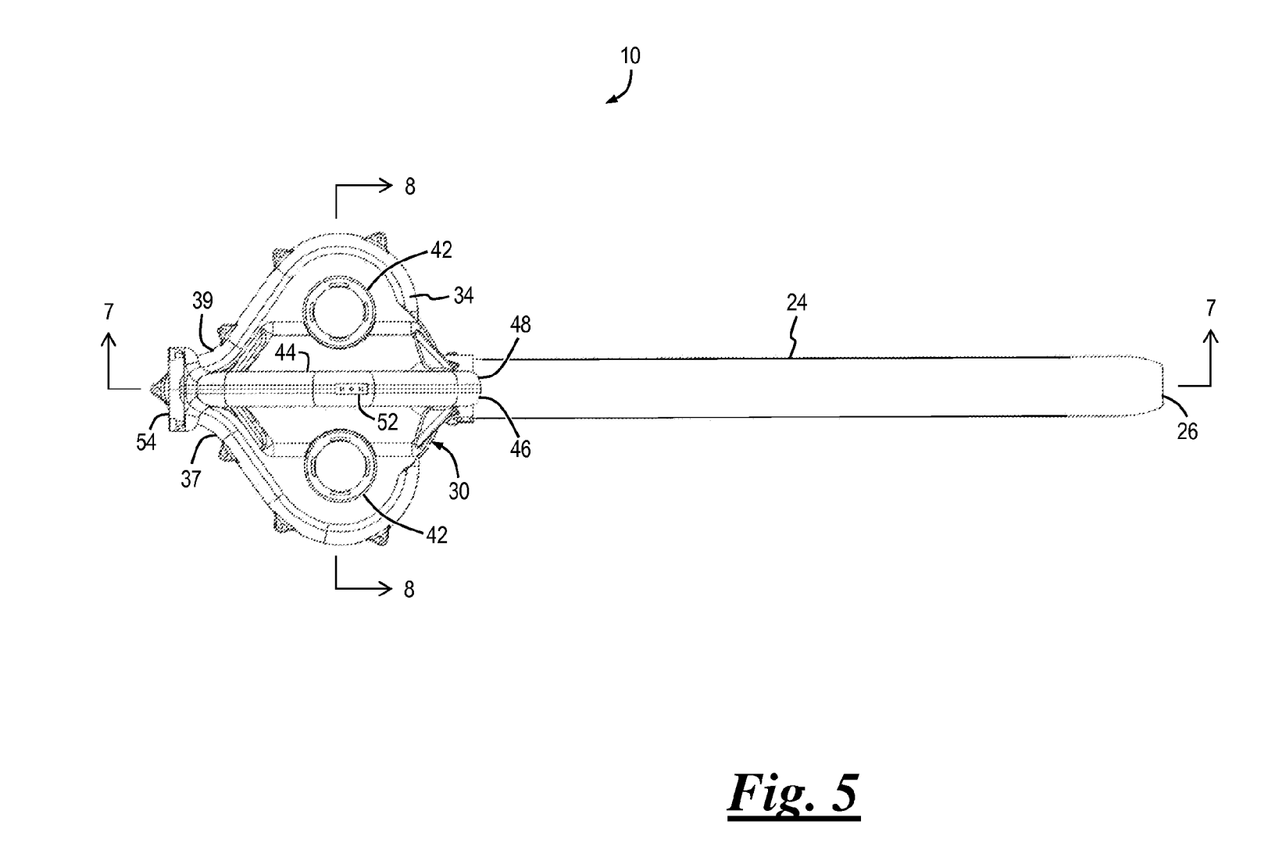
FIG. 5 is a top plan view of the portable vacuum of FIG. 1.

With particular reference to FIG. 3, portable vacuum 10 may be configured such that electric motors 38 are powered by a battery power source 54. Battery power source 54 may be made integral to or selectably detachable from the vacuum unit 30, or may be carried separately and coupled to portable vacuum 10 with electrical wiring such as a power cord. Alternatively, portable vacuum 10 may be configured such that electric motors 38 are powered by an AC power source, such as a power cord or cable 56 coupled to a household AC electrical outlet.

Figure 1:
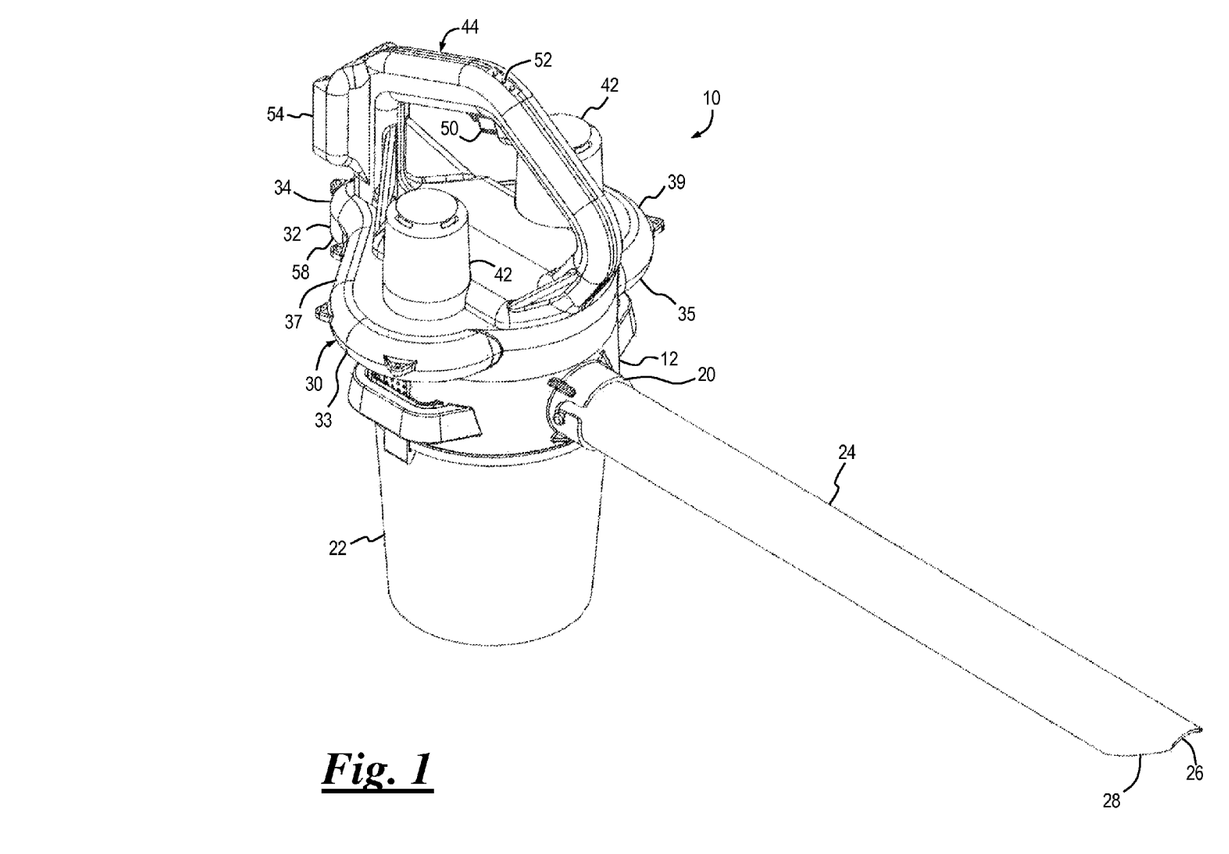
FIG. 1 shows a perspective view of a portable vacuum for yard waste according to an embodiment of the present invention.
Figure 2:
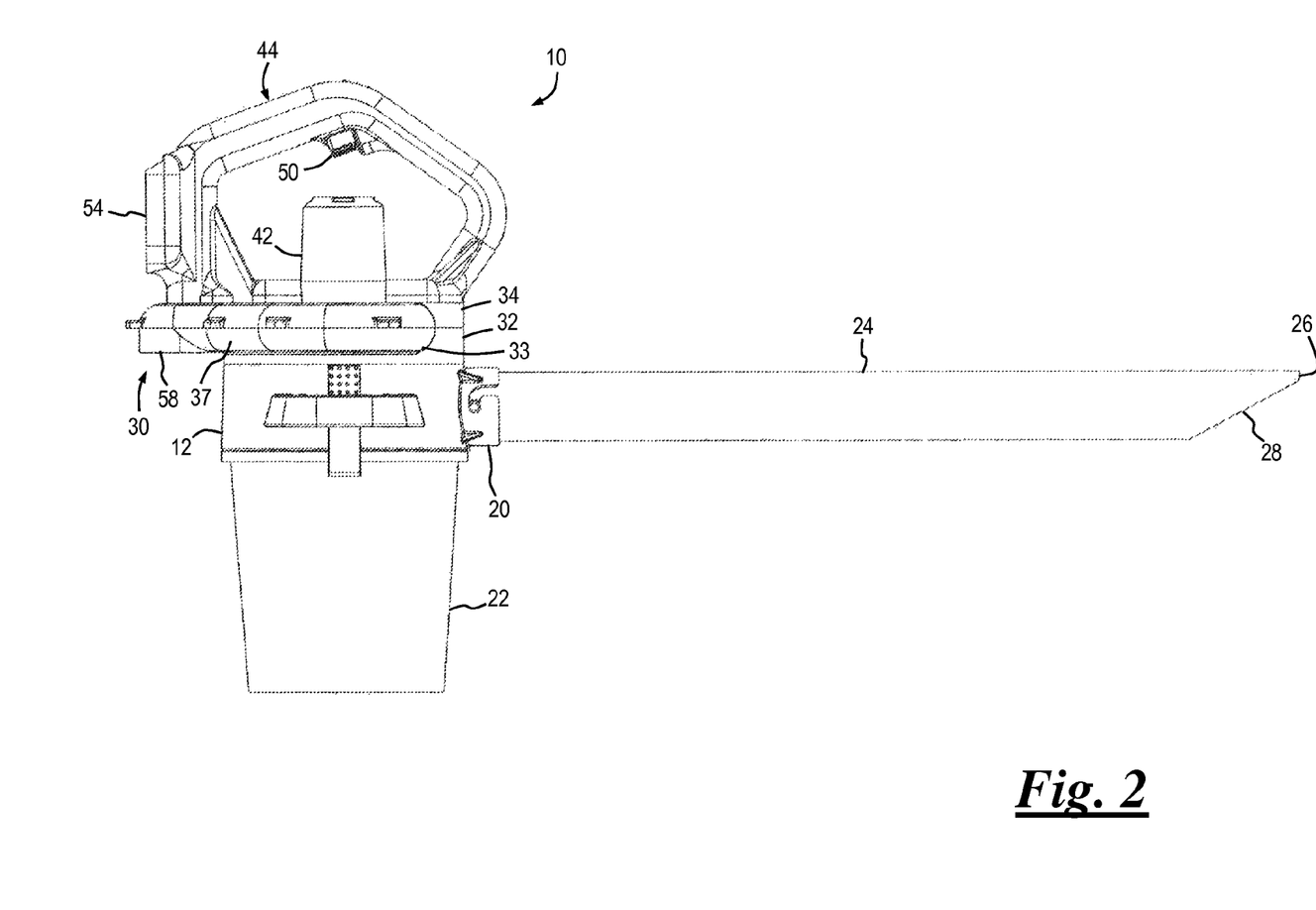
FIG. 2 is a right-side elevational view of the portable vacuum of FIG. 1.
Figure 6:
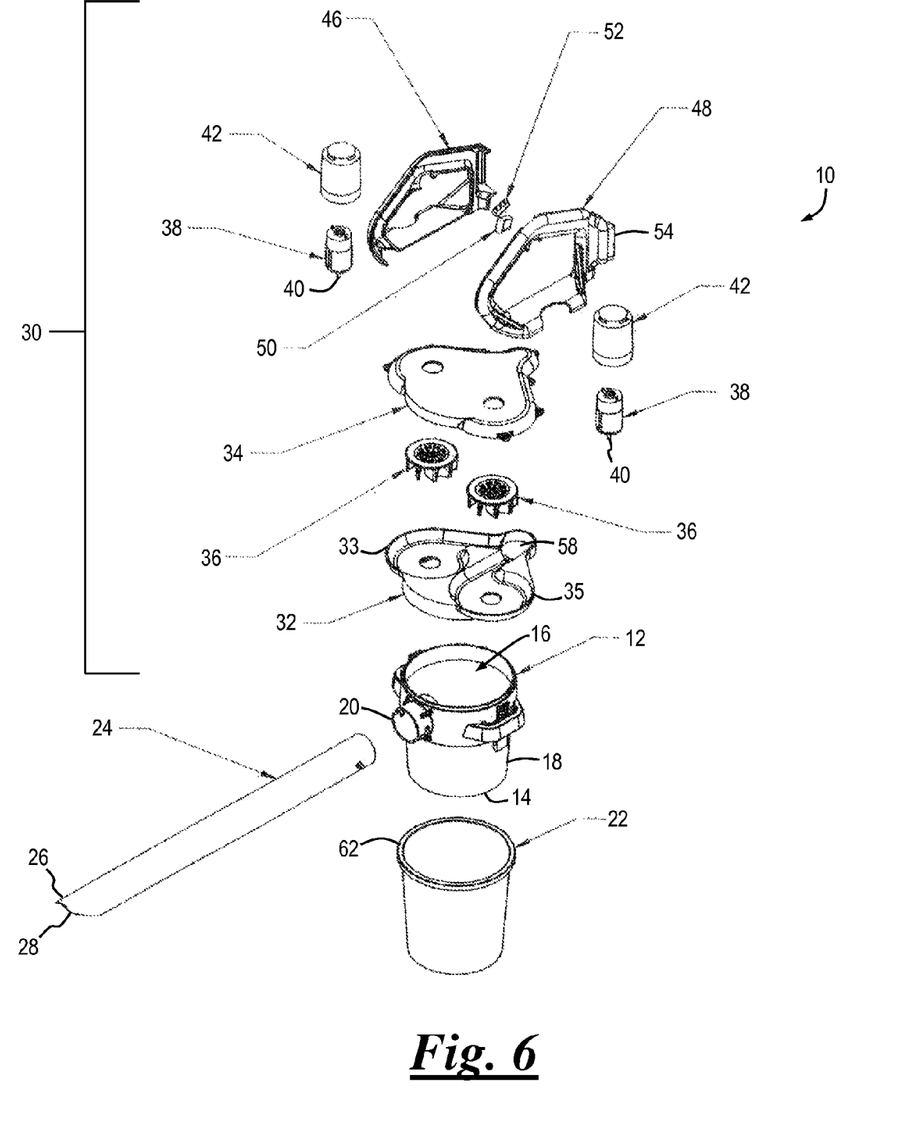
FIG. 6 is an exploded view of the portable vacuum of FIG. 1.
Figure 7:
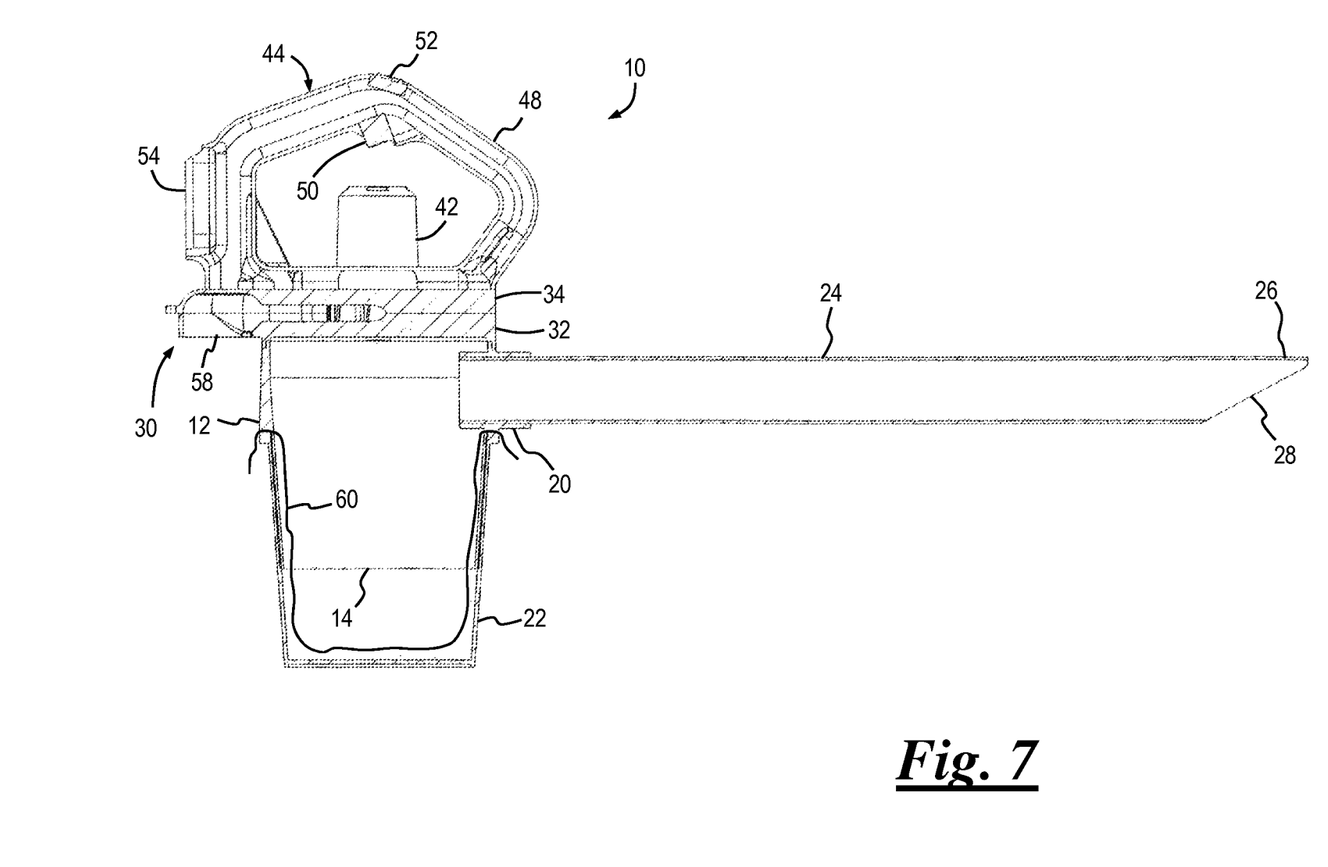
FIG. 7 is a right-side elevational view in section of the portable vacuum of FIG. 1.
Figure 8:
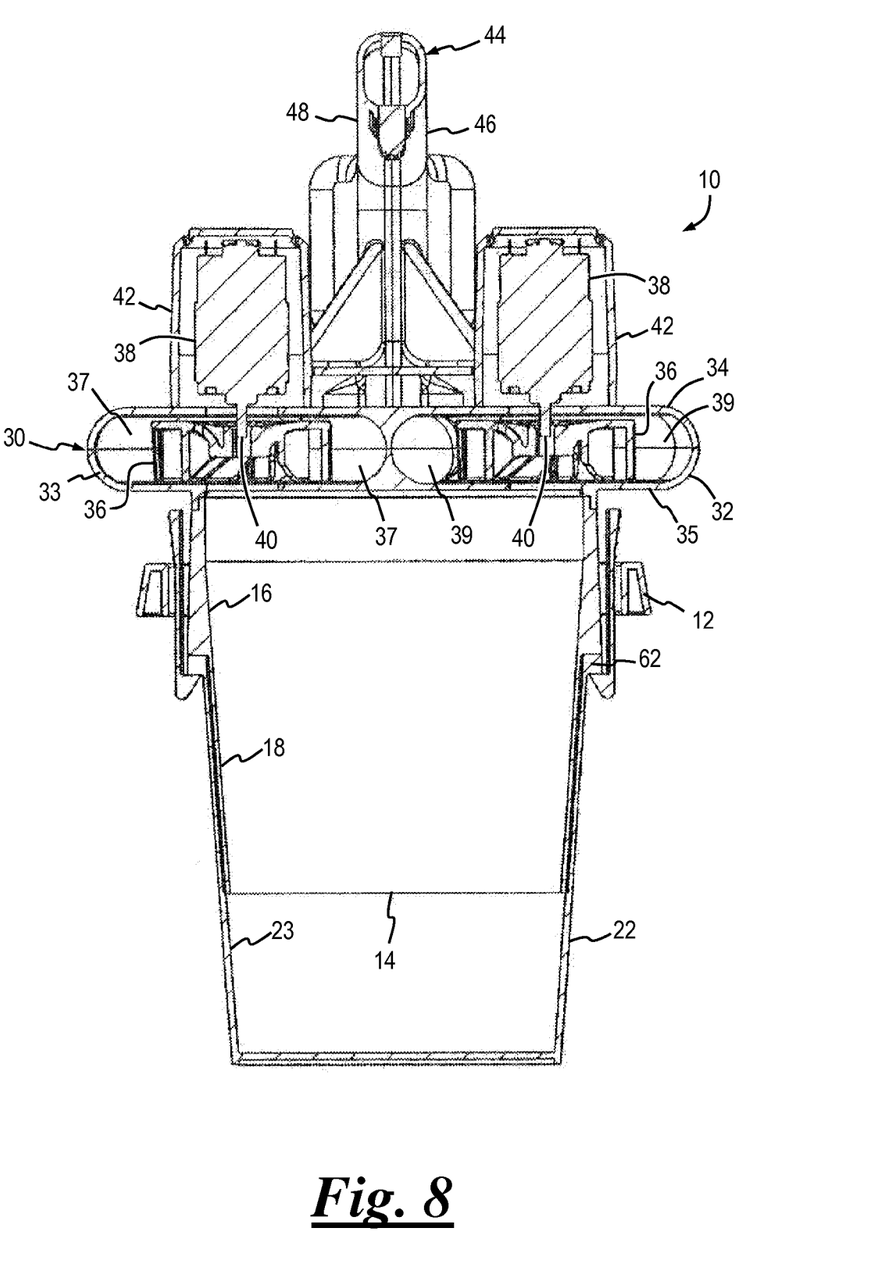
FIG. 8 is a rear elevational view in section of the portable vacuum of FIG. 1.

In operation, an electrical power source 54 or 56 is coupled to portable vacuum 10. ON-OFF switch 40 is set to an ON position, causing electrical voltage from the power source to be supplied to electric motors 38. In response, output shafts 40 of electric motors 38 rotate, in turn causing fans 36 to rotate. As best shown in FIGS. 2, 6 and 7, vacuum unit 30 includes one or more exhaust ports 58 in communication with ducted left air passage 37 and ducted right air passage 39. The rotation of fans 36 cause air to be drawn out of container 12 and bucket 22 and exhausted through one or more exhaust ports 58, resulting in the development of air suction through suction tube 24.

A user aims distal end 26 of suction tube 24 at debris to be collected, such as leaves, twigs, animal waste and other waste solids. The debris is drawn into suction tube 24 by the aforementioned suction and into container 12. The debris drops through open bottom 14 of container 12, into bucket 22. The collected debris accumulates in container 12 and co-axially attached bucket 22 until the container/bucket assembly is full. The user then detaches bucket 22 from container 12, debris accumulated in the container falling into the bucket as the bucket is moved away from the container. The user disposes of the debris by emptying bucket 16, then re-attaches the bucket to container 16.

In some embodiments of the present invention a removable liner 60, shown generally in FIG. 7, may be disposed in bucket 22. Liner 60 is installed by detaching bucket 22 from container 12 and placing the liner 60 in the bucket such that an open end of the liner is draped over a lip 62 of the bucket, then re-attaching the bucket to the container. Liner 60 receives the waste material collected by portable vacuum 10, and may be replaced when full by detaching bucket 22 from container 12, removing the full liner, and placing a new liner in the bucket in the manner described above.

Liner 60 may be made of any material suitable for use with portable vacuum 10. Example materials include, without limitation, flexible or rigid plastics such as LDPE (Low Density Polyethylene), LLDPE (Linear Low Density Polyethylene), HDPE (High Density Polyethylene), and biodegradable polythene film. Paper materials such as waxed or unwaxed paper bags may also be utilized for liner 60.

Optional voltage indicator 52 provides the user with a visually perceivable indication of the status of stored energy remaining in battery 54. Voltage indicator 52 may also function as a battery charging status indicator and as an on-off indicator. Voltage indicator 52 may be any suitable type of indicator including, without limitation, analog and digital meters, liquid-crystal bargraph displays and light-emitting diode bargraph displays.

In still other embodiments bucket 22 may be made disposable. In these embodiments bucket 22 may be made from, without limitation, materials such as flexible or rigid plastics such as LDPE, LLDPE, HDPE, and biodegradable polythene film. Waxed or unwaxed paper and/or paperboard materials may also be utilized to form a disposable bucket 22. Filled disposable buckets 22 may be detached from container 12 and disposed of, a new disposable bucket being attached to the container. When bucket 22 is configured as a disposable item the bucket may optionally include one or more closures, such as flaps, lids, drawstrings and the like for closing off the bucket prior to disposal.

The foregoing description is intended to illustrate the present invention, not to limit the present invention to a specific embodiment. For example, one skilled in the art will appreciate that, in some embodiments, tube 24 may be removed and attached to exhaust port 58 to utilize portable vacuum 10 in a blower mode. Alternatively, portable vacuum 10 may be configured such that fans 36 draw air in from exhaust port 58 to pressurize container 12 and bucket 22, thereby causing air to be expelled from tube 24. In this configuration portable vacuum may be utilized as a blower to move yard waste such as leaves.

Similarly, one skilled in the art will appreciate that the electric motors 38 and electric power supply 54, 56 may be replaced with an internal combustion engine and a fuel supply, respectively, the engine being operably coupled to fans 36 to generate suction at the distal end 26 of suction tube 24.

While this invention has been shown and described with respect to a detailed embodiment thereof, it will be understood by those skilled in the art that changes in form and detail thereof may be made without departing from the scope of the claims of the invention.

What is claimed is:

1. A portable vacuum, comprising:
    a container having a sidewall, an open bottom portion, an opposing, open top portion and an attachment opening in the sidewall;
    a bucket detachably coupled to the container, the bucket receiving the bottom portion of the container;
    a vacuum unit detachably coupled to and closing off the top portion of the container, the vacuum unit having at least one air inlet, at least one air exhaust port, a pair of rotatable fans, an upper fan case, and a lower fan case, the upper and lower fan cases being configured to separately enclose each fan and to form a separate ducted air passage from each fan to the exhaust port, the vacuum unit being operable to selectably generate an air stream entering the air inlet and exiting the air exhaust port; and
    an elongate, hollow suction tube having a first end and an opposing second end, the first end being detachably coupled to the attachment opening of the container,
    the air stream generating a vacuum at the second end of the suction tube operable to draw waste material into the suction tube, the waste material being deposited in the bucket.

2. The portable vacuum of claim 1, further including a pair of electric motors, each electric motor being coupled to a corresponding one of the rotatable fans, the electric motors being selectably coupled to an electric power source and being operable to rotate the rotatable fans when coupled to the electric power source.

3. The portable vacuum of claim 2, further comprising a pair of motor covers, each motor cover enclosing a corresponding one of the electric motors.

4. The portable vacuum of claim 2, further comprising an electrical switch to selectably couple the electric motors to the electric power source.

5. The portable vacuum of claim 4 wherein the electrical switch is a momentary switch.

6. The portable vacuum of claim 2 wherein the electric motors are selectably coupled to an AC electric power source.

7. The portable vacuum of claim 2 wherein the electric motors are selectably coupled to a battery electric power source.

8. The portable vacuum of claim 7 wherein the battery electric power source is selectably attachable to, and detachable from, the vacuum unit.

9. The portable vacuum of claim 2, further comprising a voltage indicator operable to provide an indication of the status of the electric power source.

10. The portable vacuum of claim 1 wherein the vacuum unit further includes a carrying handle.

11. The portable vacuum of claim 10 wherein the carrying handle is configured to receive a detachable battery electric power source, the battery electric power source being operable to power the rotatable fans.

12. The portable vacuum of claim 10 wherein the carrying handle includes a momentary electrical switch, the electrical switch being operable to control the rotatable fans.

13. The portable vacuum of claim 1, further including a removable liner disposed in the bucket.

14. The portable vacuum of claim 1 wherein the bucket is disposable.

15. The portable vacuum of claim 1 wherein the second end of the suction tube includes an angled portion.

16. The portable vacuum of claim 1 wherein the sidewall of the container is configured to extend into the bucket when the bucket is coupled to the container, and is further configured to abut against a major portion of a sidewall of the bucket.

17. A portable vacuum, comprising:
    a container having a sidewall, an open bottom portion, an opposing, open top portion and an attachment opening in the sidewall;
    a bucket detachably coupled to the container, the bucket receiving the bottom portion of the container;
    a vacuum unit detachably coupled to and closing off the top portion of the container, the vacuum unit having:
        a pair of rotatable fans;
        an upper fan case and a lower fan case, the upper and lower fan cases enclosing the rotatable fans;
        a pair of electric motors, each motor coupled to one of the rotatable fans, the electric motors each being selectably coupled to an electric power source and being operable to rotate the rotatable fans when coupled to the electric power source;
        a carrying handle;
        a trigger switch disposed on the carrying handle and extending toward the upper fan case intermediate the pair of electric motors, the switch configured to be actuable by a finger of a user while grasping the carrying handle;
        at least one air inlet; and
        at least one air exhaust port extending through the upper and lower fan cases and in communication with the container, the upper and lower fan cases being configured to separately enclose each fan and to form a separate ducted air passage from each fan to the exhaust port;
    the vacuum unit being operable to selectably generate an air stream entering the air inlet and exiting the air exhaust port; and
    an elongate, hollow suction tube having a first end and an opposing second end, the first end being detachably coupled to the attachment opening of the container, the air stream generating a vacuum at the second end of the suction tube operable to draw waste material into the suction tube, the waste material being deposited in the bucket.

18. A method for collecting waste material, comprising the steps of:
providing a container having a sidewall, an open bottom portion, an opposing, open top portion and an attachment opening in the sidewall;
detachably coupling a bucket to the container, the bucket receiving the bottom portion of the container;
detachably coupling a vacuum unit to the top portion of the container, the vacuum unit closing off the top portion of the container and having at least one air inlet, at least one air exhaust port, a pair of rotatable fans, an upper fan case, and a lower fan case, the upper and lower fan cases being configured to separately enclose each fan and to form a separate ducted air passage from each fan to the exhaust port, the vacuum unit being operable to selectably generate an air stream entering the air inlet and exiting the air exhaust port; and
detachably coupling a first end of an elongate, hollow suction tube to the attachment opening of the container, the suction tube having an opposing second end,
the air stream generating a vacuum at the second end of the suction tube operable to draw waste material into the suction tube, the waste material being deposited in the bucket.

19. The method of claim 18, further including the step of providing a carrying handle with the vacuum unit.

20. The method of claim 18, further comprising the step of placing a removable liner in the bucket.

* * * * *